United States Patent [19]

Hayashi

[11] Patent Number: 5,306,977
[45] Date of Patent: Apr. 26, 1994

[54] COOLING ROTOR FOR AN ALTERNATOR MOUNTED ON VEHICLE

[75] Inventor: Seiji Hayashi, Anjo, Japan

[73] Assignee: Nippondenso Co., Ltd., Kariya, Japan

[21] Appl. No.: 925,692

[22] Filed: Aug. 7, 1992

[30] Foreign Application Priority Data

Aug. 8, 1991 [JP] Japan .................. 3-224704
Jul. 31, 1992 [JP] Japan .................. 4-205014

[51] Int. Cl.$^5$ .......................... H02K 1/22; H02K 1/32
[52] U.S. Cl. ...................... 310/263; 310/61; 310/192
[58] Field of Search .............. 310/52, 61, 263, 269, 310/181, 179, 192, 125, 232, 159, 211, 156; 322/46, 47, 49

[56] References Cited

U.S. PATENT DOCUMENTS

| | | | |
|---|---|---|---|
| 4,421,998 | 12/1983 | Ahner et al. | 310/263 X |
| 4,617,485 | 10/1986 | Nakamura et al. | 310/263 X |
| 4,874,972 | 10/1989 | Bansal | |
| 4,959,577 | 9/1990 | Radomski | 310/263 |
| 5,132,581 | 7/1992 | Kusase | 310/263 |

FOREIGN PATENT DOCUMENTS 61-85045 4/1986 Japan .
3-150055 6/1991 Japan .

Primary Examiner—Steven L. Stephan
Attorney, Agent, or Firm—Cushman, Darby & Cushman

[57] ABSTRACT

A rotor for an alternator mounted on a vehicle comprises first and second claw-pole members formed of magnetic material and mounted on a shaft rotatable about an axis. The first and second claw-pole members have at least one first axially extending claw section and at least one second axially extending claw section respectively. The at least one first and second axially extending claw sections have a first side face and a second side face respectively. A field coil is disposed between the first and second claw-pole members. A permanent magnet is disposed between the first and said second side faces and is polarized in a direction which prevents magnetic flux leakage between the at least one first and second axially extending claw sections. The rotor has a space formed between the permanent magnet and at least one of the first and second side faces.

13 Claims, 8 Drawing Sheets

COOLING ROTOR FOR AN ALTERNATOR MOUNTED ON VEHICLE

BACKGROUND OF THE INVENTION

1. Field of the Invention

The present invention generally relates to a rotor of an alternator mounted on a vehicle. More specifically, the invention relates to a magnetic-field rotor having Lundell-type pole cores.

2. Description of the Related Art

As a known technique for improving the output of an alternator mounted on a vehicle, there has been disclosed an "alternator for motor vehicle" in Japanese Patent Laid-Open No. 61-85045. That is, there is such an alternator for a motor vehicle which has a magnetic-field rotor using Lundell-type pole cores, in which a permanent magnet is disposed between pole core claws to increase the effective magnetic flux which contributes to the generation of electric energy, thereby improving output power.

The rotor of the above-described alternator for a motor vehicle, however, has a problem in that since air passage between the claws of the pole core is interrupted, permanent magnets and field coils will become heated with heat generated mainly at the field coils themselves. If the temperature of the permanent magnet rises, the magnetic force decreases, resulting in a lowered effect of prevention of magnetic flux leakage between the claws of the pole cores. Furthermore, with the rise of the magnetic coil temperature, line resistance increases and accordingly, the electric current that flows will decrease, reducing the magnetic flux and consequently the output power.

SUMMARY OF THE INVENTION

The present invention has been accomplished in an attempt to solve the problems mentioned above and has as its object the provision of a rotor of an alternator mounted on a motor vehicle that has been developed for producing high output power with a permanent magnet disposed between pole core claws so as to provide a specific cooling performance.

To solve the problem mentioned above, the present invention provides a rotor of an alternator for motor vehicles, which comprises a pair of Randel-type pole cores which have a plurality of claws on the outer periphery engaged with each other and are mounted in opposite positions on a rotating shaft; a field coil disposed inside the pair of pole cores mounted in opposite positions; and a permanent magnet disposed between the side faces of the claws adjacent to the pair of pole cores located at opposite positions and polarized in a direction in which magnetic flux leakage between the adjacent claws will be prevented. There is a space formed between the side faces of the permanent magnet and facing the side face of the claw section.

The space formed between the claw section and the permanent magnet is formed by providing a groove in either one of the side face of the claw section and the side face of the permanent magnet. It is preferable that the groove be so provided as to radially extend.

This space between the claw section and the permanent magnet can be formed by interposing a nonmagnetic member therebetween. This nonmagnetic member may be integrally formed in the shape of a ring.

According to the above-described construction, the magnetic flux leakage can be diminished by the use of the permanent magnet disposed between the claw sections of the pole cores, thereby enabling an increase in the output current in relation to the number of revolutions of the rotor. Furthermore since there exists a gap between the side face of the permanent magnet and the side face of the claw section of the pole core, air passage between the pole core claw sections will not be disturbed.

The space between the side face of the permanent magnet and the side face of the claw section can be easily made by providing a groove in either of the side face of the permanent magnet and the side face of the claw section; Extending this groove in the radial direction allows effective escape of heat generated at the field coil, in the circumferential direction of the pole cores, thereby accelerating the cooling of the field coil and the permanent magnet. It is also possible to reduce direct heat transfer from the pole cores to the permanent magnet, thus insuring an output improving effect by the permanent magnet disposed between the pole core claws.

Interposing the nonmagnetic member between the side face of the permanent magnet and the side face of the claw section can form a gap therebetween without making grooves in the side faces of the permanent magnet and the claw section. Integrally forming this nonmagnetic member in the form of a ring facilitates the installation of the nonmagnetic member.

DETAILED DESCRIPTION OF THE EMBODIMENTS

Hereinafter exemplary embodiments of a rotor of an alternator mounted on a vehicle according to the present invention will be explained.

First Embodiment

Figure 1:
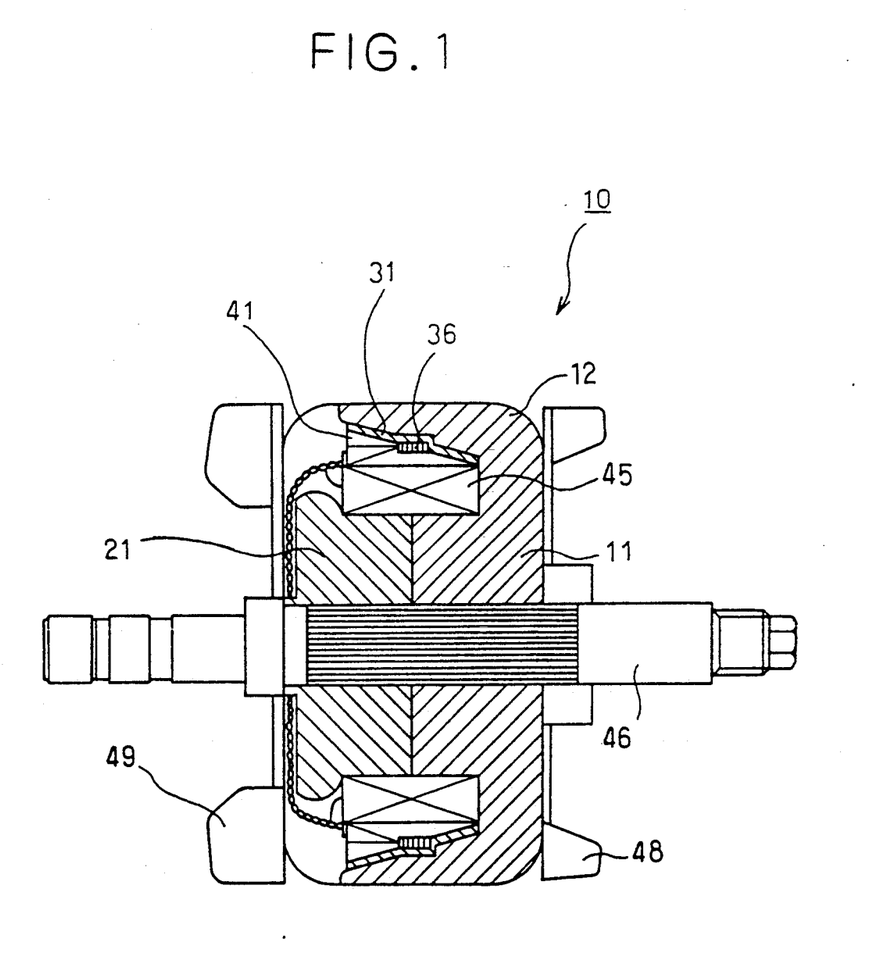
FIG. 1 is a longitudinal sectional view showing a first embodiment of a rotor of an alternator for motor vehicles according to the first embodiment of the present invention.
Figure 2:
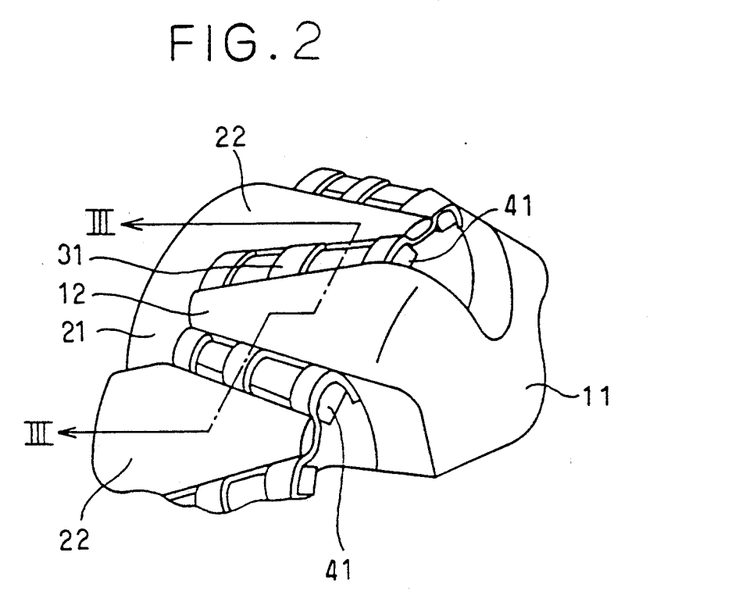
FIG. 2 is a partial perspective view showing a pair of pole cores, a first nonmagnetic ring, a second nonmagnetic ring, and a permanent magnet in an installed condition of the first embodiment.
Figure 3:
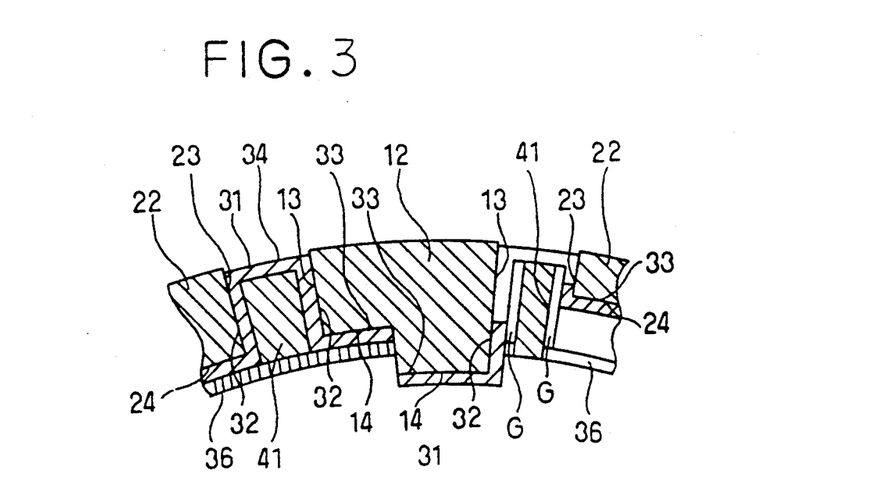
FIG. 3 is a sectional view taken along line III—III in FIG. 2.
Figure 4:
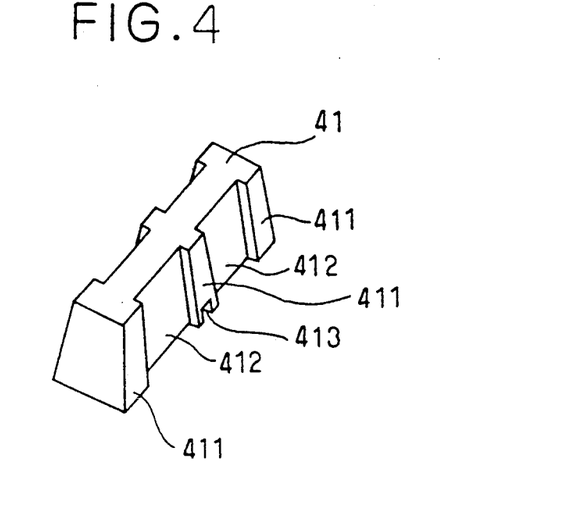
FIG. 4 is a perspective view showing the permanent magnet of the same embodiment.
Figure 5:
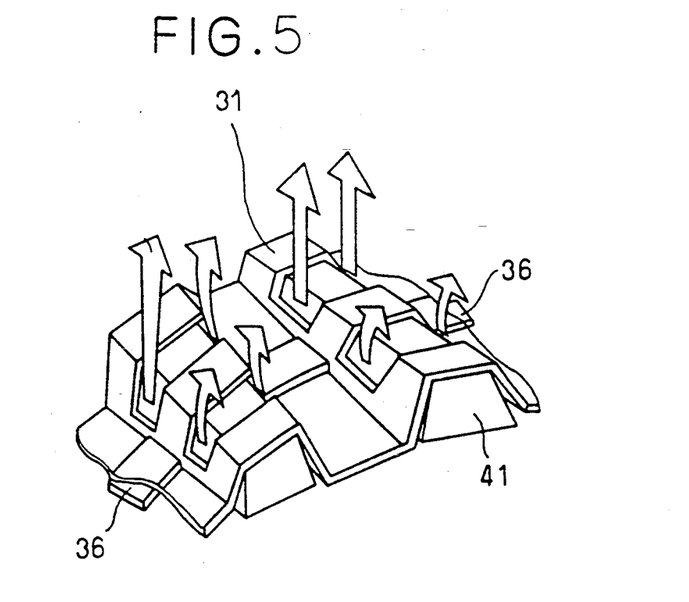
FIG. 5 is a perspective view showing the first nonmagnetic ring, the second nonmagnetic ring and the permanent magnet in an installed condition of the first embodiment, and the flow of air.

FIG. 1 is a longitudinal sectional view showing the construction of a first embodiment of a rotor of an alternator mounted on a motor vehicle according to the present invention. FIG. 2 is a partial perspective view showing a pair of pole cores, first and second nonmagnetic rings, and a permanent magnet in an installed condition. FIG. 3 is a partial longitudinal sectional view taken along line III—III of FIG. 2. FIG. 4 is a perspective view showing the permanent magnet. FIG. 5 is a perspective view showing the first and second nonmagnetic rings and the permanent magnet in an installed state, and also showing the flow of air.

A rotor 10 of an alternator mounted on a motor vehicle, as shown in FIG. 1, is composed mainly of a pair of pole cores 11 and 21, a first nonmagnetic ring 31, a second nonmagnetic ring 36, a permanent magnet 41, a field coil 45, a shaft 46, and fans 48 and 49.

The pole cores 11 and 21 have a plurality of claws 12 and 22 which serve as claw-like magnetic poles protruding axially on the outer peripheral side. These pole cores 11 and 21 hold the field coil 45 in a space formed inside between the claw sections 12 and 22 which are assembled in opposite positions, and integrally installed on a knurled end of the shaft 46.

Also as shown in FIGS. 2 and 3, the first nonmagnetic ring 31 is so formed that its side face 32 will contact the side faces 13 and 23 of the claw sections 12 and 22 of the pole cores 11 and 21, its bottom section 33 will contact the inner side faces 14 and 24 of the claw sections 12 and 22, its outer peripheral section 34 will fill a gap between the opposite claw sections 12 and 22, and its outer diameter surface will be nearly the same as the outer diameter surface of the claw sections 12 and 22.

The second nonmagnetic ring 36 has a nearly annular form, is mated with the first nonmagnetic ring 31 in the vicinity of the inner side faces 14 and 24 of the claw sections 12 and 22 of the pole cores 11 and 12, and is united into one body by welding or the like.

At this time, the permanent magnet 41 is held by the first nonmagnetic ring 31 and the second nonmagnetic ring 36. This permanent magnet 41, as shown in FIG. 4, has a land section 411 and a recess section 412 (a groove section) formed in the side face, and a cutout 413 in the bottom section. Either of the pole cores 11 and 21 has a gap G formed in the recess section 412 on the side face 13, 23 of the claw sections 12 and 22 (in the present invention, the gap G is provided in two places on the side face 13, 23 of the claw sections 12 and 22 of the pole cores 11 and 21). The permanent magnet 41 has been polarized in a direction in which magnetic flux leakage between the magnetic poles of the claw sections 12 and 22 of the pole cores 11 and 21 will be prevented. In the cutout 413 is inserted the second nonmagnetic ring 36, by which the permanent magnet 41 can be reliably held.

Next, the mode of operation of the rotor according to the present invention will be explained.

The magnetic flux generated by the field coil 45 is supplied to a stator (not illustrated) installed in the vicinity of the outer peripheral surface of the pole cores 11 and 21 through the pole cores 11 and 21, and also flows as a leaking magnetic flux to the claw sections 12 and 22 of the pole cores 11 and 21 assembled at opposite positions.

Since the permanent magnet 41 is disposed between the claw sections 12 and 22 of the pole cores 11 and 21, a part of the leaking magnetic flux can be utilized as an effective magnetic flux, thereby enabling reducing the leakage of the magnetic flux as a result.

Since the second nonmagnetic ring 36 is nearly annular, the first nonmagnetic ring 31 integrally assembled with the second nonmagnetic ring 36 can be increased extremely high in mechanical strength in a centrifugal direction.

As shown by an arrow mark in FIG. 5, air flows through a gap formed by assembling the permanent magnet 41 with the first nonmagnetic ring 31. Therefore, heat produced at the field coil 45 held within the pole cores 11 and 21 can escape in the outer peripheral direction of the pole cores 11 and 21, thus improving the cooling of the field coil 45 and the cooling of the permanent magnet 41.

Second Embodiment

Figure 6:
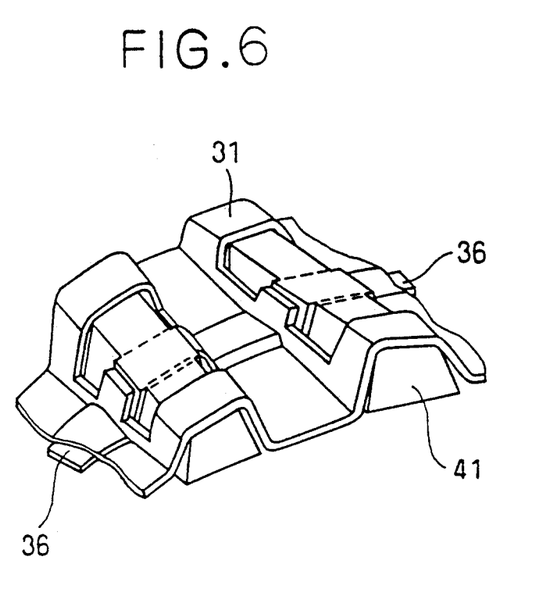
FIG. 6 is a partial perspective view showing a first nonmagnetic ring, a second nonmagnetic ring, and a permanent magnet in an installed condition of a second embodiment of the present invention.

Referring to FIG. 6, the second embodiment will be explained. It should be noted that the same members having the same constitution and function as the first embodiment are designated by the same reference numerals.

The first nonmagnetic ring 31 is formed integrally with the permanent magnet 41 by a resin magnet insert molding (magnet injection molding) method.

Therefore, in addition to the aforesaid function of the above embodiment, the insert-molded permanent magnet 41 and first nonmagnetic ring 31 will enhance the coupling strength between them. Furthermore, the use of the resin magnet for the permanent magnet can prevent magnet peeling and breakage during and after installation.

Third Embodiment

Figure 7:
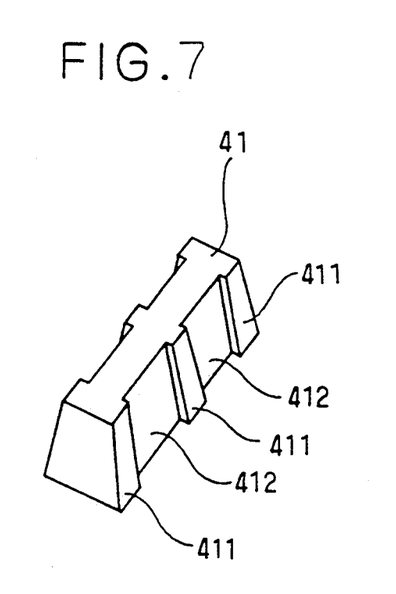
FIG. 7 is a perspective view showing a permanent magnet of a third embodiment of the present invention.
Figure 8:
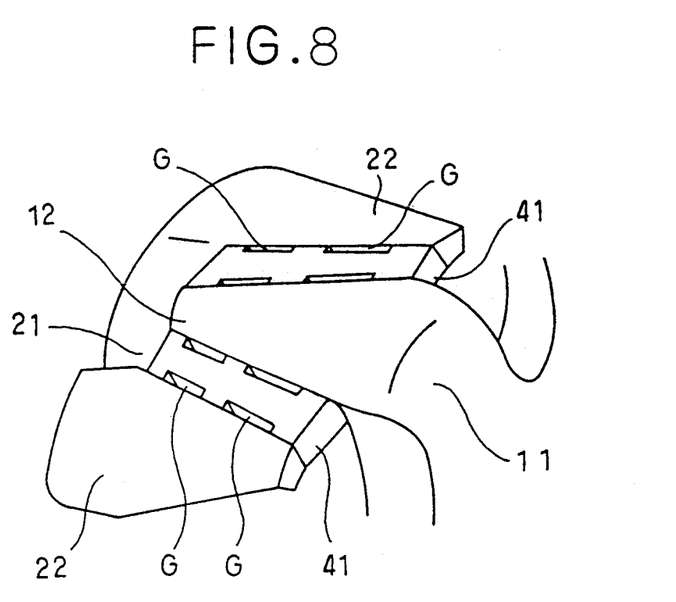
FIG. 8 is a partial perspective view showing the pair of pole cores and the permanent magnet of the same embodiment.

Referring to FIGS. 7 and 8, the third embodiment will be explained. In this embodiment, no nonmagnetic member is used between the side face of the claw sections 12 and 22 and the side face of the permanent magnet 41, but the claw sections 12 and 22 and the permanent magnet 41 are directly bonded with an adhesive. The permanent magnet, as shown in FIG. 7, has the land section 411 and the recess section 412 similar to those used in the first and second embodiment. This permanent magnet is disposed between the side face of the claw sections 12 and 22 of the pole cores 11 and 21 and the side face of the claw section is joined to the land section 411 as shown in FIG. 8. The gap G is formed by the recess section 412. The permanent magnet is formed trapezoidal in section so that it will not be flung in the centrifugal direction by centrifugal force.

The third embodiment of the above constitution is superior to the first and second embodiments in that it utilizes less components.

Fourth Embodiment

Referring to FIGS. 9 to 14, the fourth embodiment will be explained. This embodiment uses a permanent magnet having a flat side face unlike each of the above embodiments, which use the permanent magnet having the land and recess sections in the side face.

Figure 9:
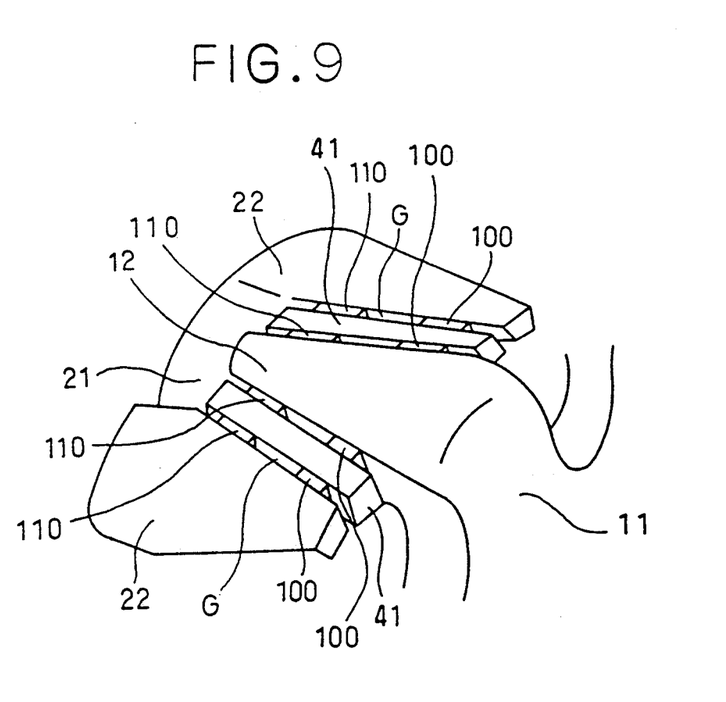
FIG. 9 is a partial perspective view showing a pair of pole cores, a nonmagnetic member and a permanent magnet in an installed condition of a fourth embodiment of the present invention.

The example shown in FIG. 9 is provided with four nonmagnetic members 100 and 110 per permanent magnet 4. The permanent magnet 41 is joined with an adhesive through the nonmagnetic member 100 between the claw sections 12 and 22.

Figure 10:
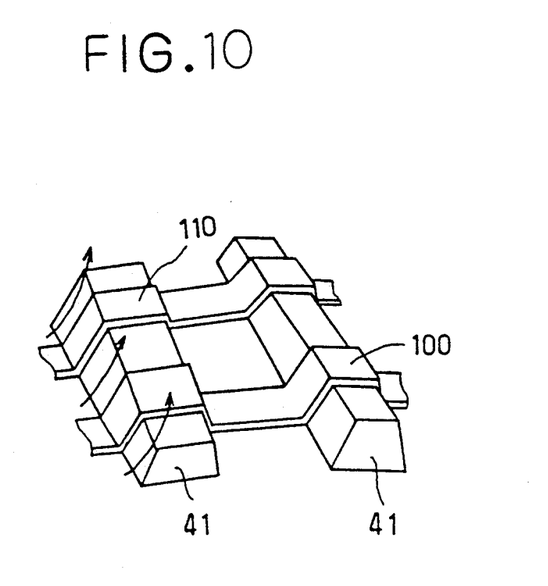
FIG. 10 is a partial perspective view showing a nonmagnetic member and a permanent magnet in an installed condition of a modified version of the fourth embodiment.

In the example shown in FIG. 10, the nonmagnetic members 100 and 110 are integrally formed in a ring shape, similar to the first nonmagnetic ring 31 of the first and second embodiments.

Figure 11:
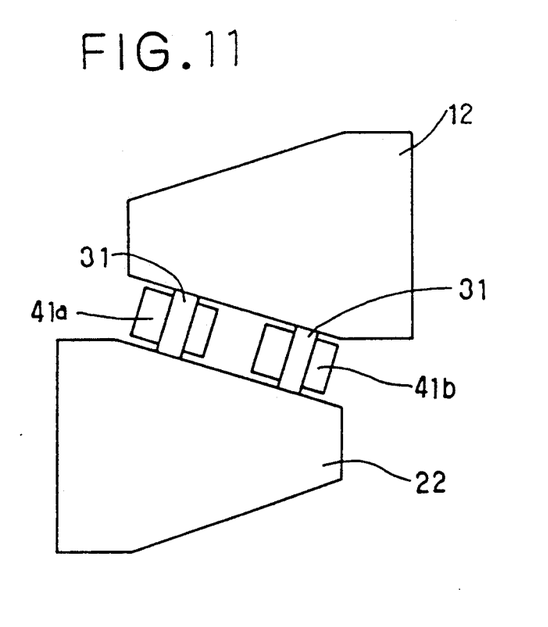
FIG. 11 is a partial plan view showing a nonmagnetic member and a permanent magnet in an installed condition of another modified version of the fourth embodiment.

FIG. 11 is a partial front view showing the permanent magnet 41 consisting of two permanent magnets 41a and 41b between which a gap is provided.

In this case the air also flows through a gap between the permanent magnets 41a and 41b. Therefore, the rotor of the above constitution of the alternator mounted on the vehicle has a cooling effect equal to, or higher than, each of the embodiments described above.

Figure 12:
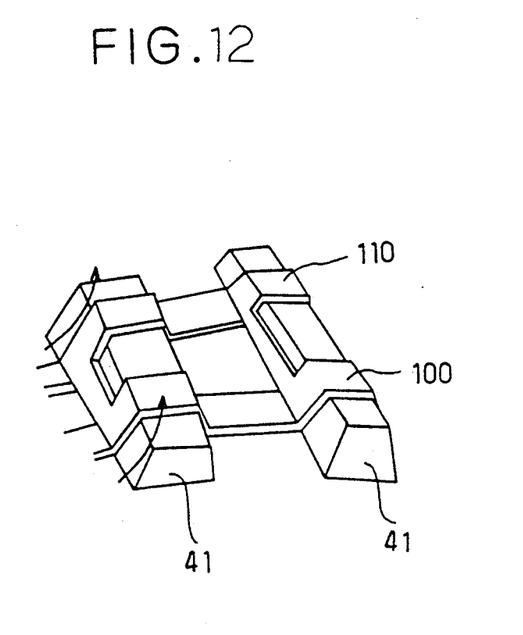
FIG. 12 is a partial perspective view showing a nonmagnetic member and a permanent magnet in an installed condition of another modified version of the fourth embodiment.
Figure 13:
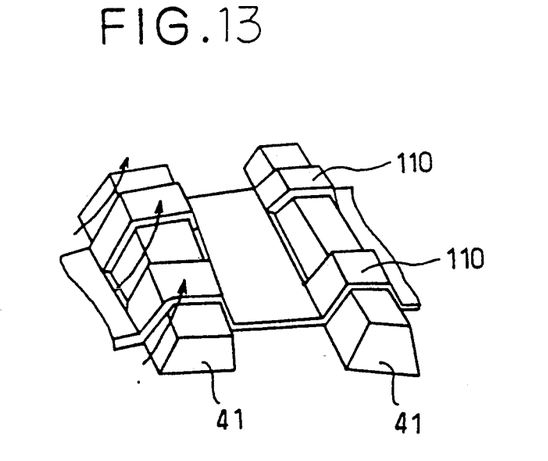
FIG. 13 is a partial perspective view showing a nonmagnetic member and a permanent magnet in an installed condition of another modified version of the fourth embodiment.
Figure 14:
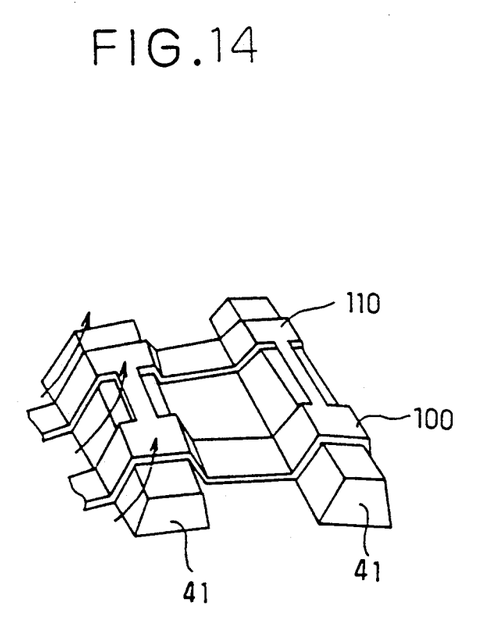
FIG. 14 is a partial perspective view showing a nonmagnetic member and a permanent magnet in an installed condition of another modified version of the fourth embodiment.

In the examples shown in FIGS. 12, 13 and 14, the nonmagnetic rings, 100 and 110 are connected into one body. The example in FIG. 12 shows the nonmagnetic rings 100 and 110 connected at the side face of the permanent magnets 41. The example in FIG. 13 shows the nonmagnetic rings 100 and 110 connected at the inner peripheral surface of the claw sections 12 and 22. The example in FIG. 14 shows the nonmagnetic rings 100 and 110 connected at the outer peripheral surface of the permanent magnet.

In any of the above examples, the permanent magnets have a simple configuration. There is a space (gap) where no nonmagnetic member is interposed between the side face of the permanent magnet 41 and the side face of the claw sections 12 and 22; through this space the cooling air can be introduced smoothly.

In the example in FIG. 12, since the coupling section is provided on the side face of the permanent magnet 41, the gap G is provided at two places per side face of the permanent magnet 41. In the examples given in FIGS. 13 and 14, the gap G is provided at three places per side face of the permanent magnet 41, and therefore the latter has a superior cooling performance.

What is claimed is:

1. A rotor for an alternator comprising:
   first and second claw-pole members formed of magnetic material and mounted on a shaft rotatable about an axis, said first and second claw-pole members having at least one first axially extending claw section and at least one second axially extending claw section respectively, said at least one first and second axially extending claw sections having a first and second side face respectively;
   a field coil disposed between said first and second claw-pole members; and
   a permanent magnet disposed between said first and said second side faces and being polarized in a direction which prevents magnetic flux leakage between said at least one first and second axially extending claw sections, said rotor having a space formed between said permanent magnet and at least one of said first and second side faces.

2. A rotor for an alternator as claimed in claim 1, wherein said space is defined in part by a groove formed in said permanent magnet.

3. A rotor for an alternator as claimed in claim 1, wherein said space is defined in part by a groove formed in at least one of said first and second side faces.

4. A rotor for an alternator as claimed in claim 3, wherein said groove extends in a radial direction with respect to the axis of said rotatable shaft.

5. A rotor for an alternator as claimed in claim 2, wherein said groove extends in a radial direction with respect to the axis of said rotatable shaft.

6. A rotor for an alternator as claimed in claim 1, wherein a plurality of non-magnetic members are disposed in spaced relation along a length of said permanent magnet and between said permanent magnet and said first and second side faces, said non-magnetic members having a thickness thereof defining a length of said space formed between said permanent magnet and at least one of said first and second side faces.

7. A rotor of an alternator as claimed in claim 6, wherein said non-magnetic members are in the form of ring elements having lands and recesses which contact an inner diameter surface and said side faces of said at least one first and second claw sections.

8. A rotor of an alternator as claimed in claim 7, wherein said ring elements are integrally connected into one body.

9. A rotor of an alternator as claimed in claim 8, wherein said ring elements are integrally connected at a portion disposed between said permanent magnet and said at least one first and second claw sections, said permanent magnet having grooves extending in a radial direction with respect to said axis of said rotatable shaft.

10. A rotor for an alternator as claimed in claim 8, wherein said ring elements are integrally connected along-side an outer diameter surface of said permanent magnet.

11. A rotor for an alternator comprising:
    first and second claw-pole members formed of magnetic material and oppositely mounted on a shaft rotatable about an axis, said first and second claw-pole members having at least one first claw section and at least one second claw section respectively, said at least one first and second claw sections each having a respective side face and an inner diameter surface;
    a field coil disposed between said first and second claw-pole members;
    a first non-magnetic ring member having lands and recesses extending in a radial direction with respect to the axis of said rotatable shaft, said first non-magnetic ring member being disposed about said field coil and in contact with the inner diameter surfaces and at least part of the side faces of said at least one first and second claw sections;
    a second non-magnetic ring member disposed within said first ring member; and
    a permanent magnet held by said first and second non-magnetic ring members between said side faces of said at least one first and second claw sections and polarized in a direction which prevents magnetic flux leakage between said at least one first and second claw sections, said rotor having a space formed between said permanent magnet and at least one of said side faces of said at least one first and second claw sections.

12. A rotor for an alternator as claimed in claim 11, wherein said permanent magnet is insert-molded in at least one of said first and second non-magnetic ring members.

13. A rotor for an alternator comprising:
first and second claw-pole members formed of magnetic material and oppositely mounted on a shaft rotatable about an axis, said first and second claw-pole members having a plurality of first and second axially extending claw sections respectively;
a field coil disposed between said first and second claw-pole members; and
a plurality of permanent magnets, each being disposed between a respective first and second axially extending claw section and polarized in a direction which prevents magnetic flux leakage between said respective first and second axially extending claw sections, said rotor having a space formed between each of said permanent magnets and at least one of said respective first and second claw sections.

* * * * *